US009215442B2

(12) United States Patent
Su et al.

(10) Patent No.: US 9,215,442 B2
(45) Date of Patent: Dec. 15, 2015

(54) DEVICES AND METHODS FOR 3-D IMAGE PROCESSING

(75) Inventors: Chen-Kang Su, Taipei Hsien (TW); Hsin-Yu Chen, Taipei Hsien (TW)

(73) Assignee: ACER INCORPORATED, Taipei Hsien (TW)

( * ) Notice: Subject to any disclaimer, the term of this patent is extended or adjusted under 35 U.S.C. 154(b) by 480 days.

(21) Appl. No.: 13/592,753

(22) Filed: Aug. 23, 2012

(65) Prior Publication Data

US 2013/0050203 A1 Feb. 28, 2013

(30) Foreign Application Priority Data

Aug. 23, 2011 (TW) .............................. 100130068 A

(51) Int. Cl.
G06T 15/00 (2011.01)
H04N 13/00 (2006.01)
G06T 19/00 (2011.01)

(52) U.S. Cl.
CPC ....... *H04N 13/0025* (2013.01); *H04N 13/0048* (2013.01); *G06T 19/00* (2013.01); *H04N 2213/003* (2013.01)

(58) Field of Classification Search
CPC ........... H04N 13/0048; H04N 13/0025; G06T 17/20; G06T 19/00
See application file for complete search history.

(56) References Cited

U.S. PATENT DOCUMENTS

| 5,652,616 | A | 7/1997 | Chen et al. | |
|---|---|---|---|---|
| 6,043,838 | A | 3/2000 | Chen | |
| 2008/0303892 | A1* | 12/2008 | Kim et al. | 348/42 |
| 2010/0066811 | A1* | 3/2010 | Chang et al. | 348/43 |
| 2011/0149021 | A1* | 6/2011 | Hulyalkar et al. | 348/42 |

FOREIGN PATENT DOCUMENTS

| CN | 1179065 | 4/1998 |
|---|---|---|
| CN | 1226786 | 8/1999 |
| EP | 2 302 939 | 3/2011 |

OTHER PUBLICATIONS

Chinese language office action dated May 15, 2014.
English language translation of abstract of CN 1179065 (published Apr. 15, 1998).
English language translation of abstract of CN 1226786 (published Aug. 25, 1999).
Taiwanese language office action dated Nov. 25, 2013.
"Stereoscopic Television MPEG-2 Multi-View Profile;" Rep. ITU-R BT.2017; 1997; pp. 1-8.
Yuan, B.; "A Novel H.264 Based Motion Vector Recovery Method for 3D Video Transmission;" IEEE Transactions on Consumer Electronics; vol. 53; No. 4; Nov. 2007; pp. 1546-1552.
European Search Report dated Aug. 6, 2014.
Vetro, A., et al.; "Overview of the Stereo and Multiview Video Coding Extensions of the H.264/MPEG-4 AVC Standard;" Proceedings of the IEEE; vol. 99; No. 4; Apr. 2011; pp. 626-642.

* cited by examiner

*Primary Examiner* — Stephen R Koziol
*Assistant Examiner* — Robert Craddock
(74) *Attorney, Agent, or Firm* — McClure, Qualey & Rodack, LLP

(57) ABSTRACT

A 3-D image processing device for processing a 3-D image data, wherein the 3-D image data has a base frame and a dependent frame, including: an image detection unit, detecting the 3-D image data to obtain the base frame and the dependent frame; an image compensation unit, generating a compensation dependent frame by performing image compensation for the dependent frame based on the base frame; and a display device, displaying a 3-D compensation image data according to the base frame and the compensation dependent frame, wherein the base frame and the dependent frame constitute a visual 3-D image, and the base frame has more image details than the dependent frame.

8 Claims, 3 Drawing Sheets

DEVICES AND METHODS FOR 3-D IMAGE PROCESSING

CROSS REFERENCE TO RELATED APPLICATIONS

This Application claims priority of Taiwan Patent Application No. 100130068, filed on Aug. 23, 2011, the entirety of which is incorporated by reference herein.

BACKGROUND OF THE INVENTION

1. Field of the Invention

The disclosure relates generally to devices and methods for image processing, and more particularly relates to devices and methods for image processing of 3-D image optimizing technology.

2. Description of the Related Art

Due to the difference between the images of an object seen by the left eye and right eye of a human, i.e., the independent parallax images thereof, the distance of the object in the parallax images can be identified by a human and a 3-D (three-dimension) image is formed in the human brain. Nowadays, in order to realize 3-D image effect, paired images must be provided to have different visual angles so as to generate the parallax images. Also, owing to the features of parallax images and photogene of a human, 3-D image effects can be realized.

Because 3-D image data has two image data with different visual angles, the size of 3-D image data is usually larger than the size of normal 2-D image data. To reduce the size of 3-D image data, the 3-D image data may be compressed for storage. In the modern technology, the usual compression formats are MPEG-1, MPEG-2 . . . and MPEG-4, etc. Also, the 3-D image data may have parts of frames having more image information and parts of frames having less image information, for example, the data corresponding to the left eye and right eye of the 3-D video format of a Blue-ray (MPEG-4 Multi-view Video Coding) are classified as base view and dependent view, respectively. The data of the dependent view is generated by predicting the image of the base view, such that the base view has higher quality and more image information than the dependent view.

Accordingly, a 3-D video may comprise frames with different compression rates, and the image data compression causes the distortions of the frame (such as decreasing sharpness and color shifting), such that the image may be blurred and a user usually feels uncomfortable while watching the 3-D video.

BRIEF SUMMARY OF THE INVENTION

In an embodiment, a 3-D image processing device for processing a 3-D image data, wherein the 3-D image data has a base frame and a dependent frame, comprises: an image detection unit, detecting the 3-D image data to obtain the base frame and the dependent frame; an image compensation unit, generating a compensation dependent frame by performing image compensation for the dependent frame based on the base frame; and a display device, displaying a 3-D compensation image data according to the base frame and the compensation dependent frame, wherein the base frame and the dependent frame constitute a visual 3-D image, and the base frame has more image details than the dependent frame.

In an embodiment, a 3-D image processing method for processing a 3-D image data with a base frame and a dependent frame, comprises: detecting the 3-D image data to obtain the base frame and the dependent frame, wherein the base frame and the dependent frame constitute a visual 3-D image, and the base frame has more image details than the dependent frame; generating a compensation dependent frame by performing image compensation for the dependent frame based on the base frame; and displaying a 3-D compensation image data according to the base frame and the compensation dependent frame.

BRIEF DESCRIPTION OF DRAWINGS

The invention will become more fully understood by referring to the following detailed description with reference to the accompanying drawings, wherein.

DETAILED DESCRIPTION OF THE INVENTION

The making and using of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
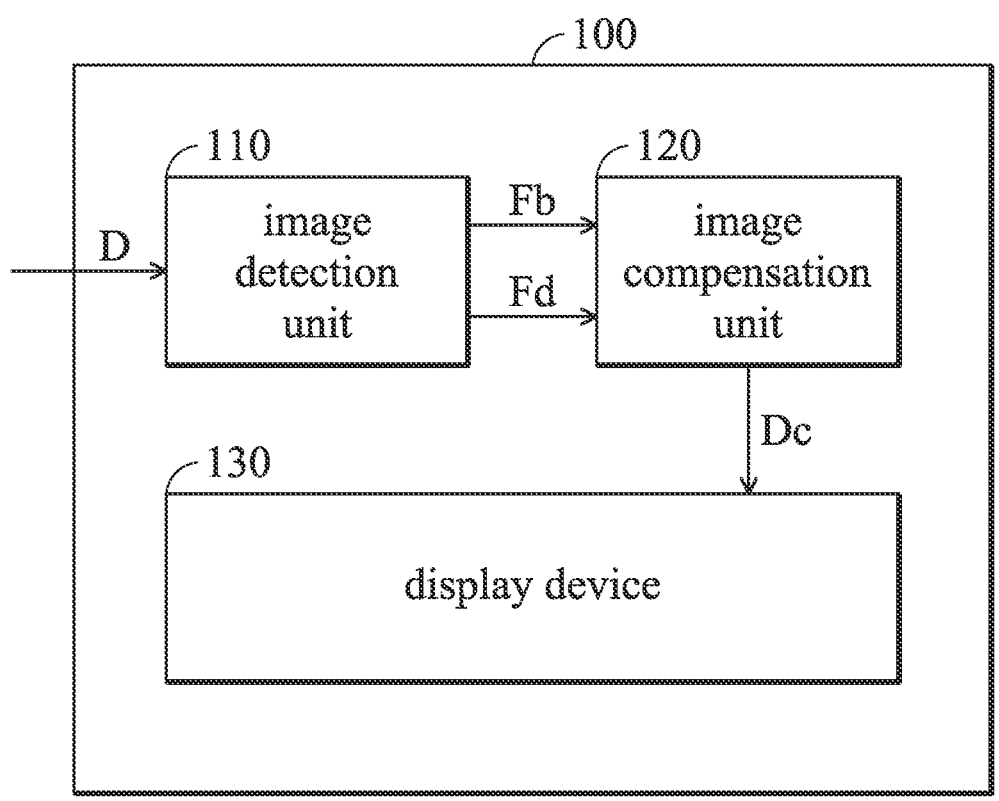
FIG. 1 is a schematic diagram illustrating an embodiment of a 3-D image processing device 100.

FIG. 1 is a schematic diagram illustrating an embodiment of a 3-D image processing device 100. In an embodiment, the 3-D image processing device 100 comprises an image detection unit 110, an image compensation unit 120, and display device 130. The image detection unit 110 detects paired frames of 3-D image data D in order to obtain a base frame Fb having more image detail and a dependent frame Fd having less image detail, wherein these two frames correspond to the left eye and right eye, respectively (referred to as the left-eye frame and right-eye frame hereafter). The image compensation unit 120 uses the base frame Fb to compensate for the dependent frame Fd, forms the base frame Fb and the compensated dependent frame Fd as a compensation image data Dc, and transmits the compensation image data Dc to the display device 130. The display device 130 outputs the compensation image data Dc, accordingly. Thus, according to the compensation, the difference between the images seen by the left eye and the right eye is reduced, and a user may watch smoother and clearer 3-D images.

In some embodiments, in order to obtain the frame which has more image detail from 3-D image data D, the detection unit 110 may perform a high pass filtering process to the left-eye frame and the right-eye frame, respectively, such that the image details of the paired frames are enhanced. Next, the detection unit 110 performs a thresholding process for the filtered frames. After the thresholding process is performed, the pixels of the frames are set to the largest gray level value if their gray level values are larger than a predetermined gray level value, and the pixels of the frames are set to the smallest gray level value if their gray level values are smaller than a predetermined gray level value. Due to the image details of the paired frame are enhanced by high pass filtering, when a frame has more image details than another frame; namely the frame has more pixels having gray level values exceeding the predetermined gray level value after a high pass filtering process than another frame. Thus, to obtain the number of the image details by the thresholding process, a frame having more image details or having less image details than another one may easily be determined. For example, by counting the number of the pixels having the largest gray level value in the paired frames respectively and comparing the numbers to each other, the base frame Fb is the frame which has more pixels having the largest gray level value than another frame, and the dependent frame Fd is the frame which has less pixels having the largest gray level value. This embodiment discloses the performing of the high pass filtering and thresholding process for the two frames in order to compare the image details with each other, and the obtaining of which one of the paired frames has more image details; however the disclosure is not limited thereto. In another embodiment, it may compare the results of the high pass filtering directly, or use the other reference value for comparison, wherein the reference value could represent the number of image details, such as compression rate. Therefore, in the Blue-ray 3-D image data format or Multi-view Video Coding format, the left-eye frame and the right-eye frame can identify which frame is the base frame Fb and which frame is the dependent frame Fd, wherein the base frame Fb is the frame which has more pixels having the largest gray level value than another frame, and the dependent frame Fd is the frame which has less pixels having the largest gray level value, such that the frames can be compensated accordingly.

Due to the base frame Fb having more image details than the dependent frame Fd being detected by the image detection unit 110, the image compensation unit 120 may obtain the related image information of the base frame Fb to compensate for the dependent frame Fd, such that the image detail and definition of the dependent frame Fd can be improved, and then the image compensation unit 120 forms the base frame Fb and the compensated dependent frame Fd as a compensated image data Dc.

Figure 2:
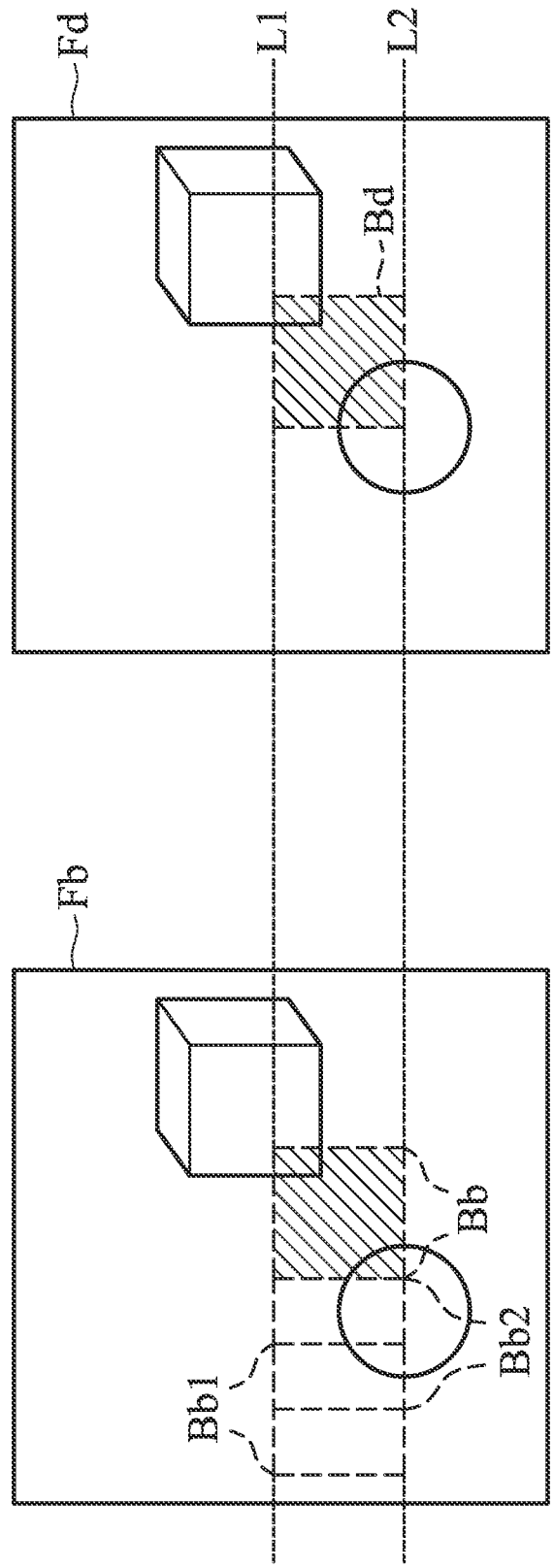
FIG. 2 is a schematic diagram illustrating an embodiment of a base frame and a dependent frame.

As shown in FIG. 2, due to the base frame Fb and the depend frame Fd corresponding to the same visual 3-D image, a visual 3-D image block of the visual 3-D image also corresponds to a base block Bb of the base frame Fb and a dependent block Bd of the depend frame Fd. Also, although a user may see the visual 3-D image by the paired frames having horizontal parallax, the blocks in different areas of the paired frames may have different horizontal shift vectors, such that a varied 3-D image effect can be realized (ex. concave or convex).

In order to use the correct base block Bb to compensate for the corresponding dependent block Bd, in some embodiments, the image detection unit 110 further searches the base frame Fb for a base block Bb, wherein the base block Bb corresponds to the dependent block Bd of the dependent frame Fd. For example, the image detection unit 110 obtains the pixels data of the dependent block Bd at first, and then the image detection unit 110 compares the dependent block Bd with a plurality of blocks (such as Bb1, Bb2) which are within the base frame Fb and have the same vertical position as the dependent block Bd (the range between the dotted line L1 and L2), wherein the block of the base frame Fb having the smallest difference with the dependent block Bd is defined as the base block Bb. In an embodiment, the image detection unit 110 may calculate the pixel difference values between the dependent block Bd and each of the blocks of the base frame Fb, wherein the blocks have the same vertical position but different horizontal positions. Next, the image detection unit 110 searches for the block having the smallest difference value based on the result of the pixel difference values, so that the base block Bb can be obtained accordingly. Therefore, the situation where the compensation unit 120 uses the wrong base block to compensate for the dependent block Bd is avoided, and the distortion of the compensated dependent block Bd is reduced.

In an embodiment, the compensation unit 120 may use the base block Bb to perform sharpness compensation for the dependent block Bd. For example, the compensation unit 120 may filter the base block Bb by a detail enhancement filter (such as a gradient enhancement filter), and add the filtered base block Bb to the dependent block Bd, such that sharpness compensation is performed.

In an embodiment, the compensation unit 120 may use the base block Bb to perform color compensation or color temperature compensation for the dependent block Bd. For example, the compensation unit 120 may obtain an average base color value by calculating the average of the color values of the pixels of the base block Bb. Similarly, the compensation unit 120 may obtain an average dependent color value by calculating the average of the color values of the pixels of the dependent block Bd. Next, the compensation unit 120 obtains an average color value difference by subtracting the average dependent color value from the average base color value, and adds the average color value difference to each of the color values of the pixels of the dependent frame Fd, such that the color value difference between the base frame Fb and the dependent frame is reduced. Also, due to the color value being divided into three color values based on RGB colors, the compensation unit 120 may further compensate for the color value of each pixel in each color of RGB colors by the similar way.

Figure 3:
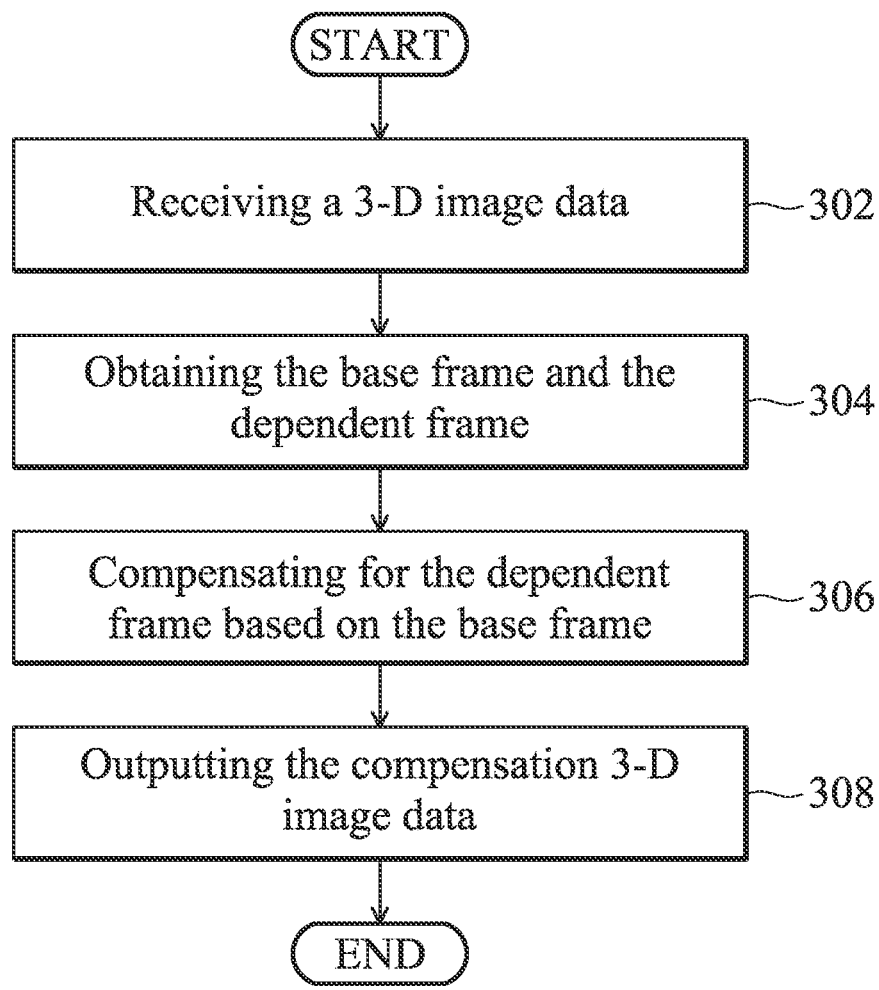
FIG. 3 is a flowchart of an embodiment of a method for a 3-D image processing device 100.

FIG. 3 is a flowchart of an embodiment of a method for the 3-D image processing device. In step S302, the detection unit 110 receives a 3-D image data D, wherein the 3-D image data D comprises a base frame and a dependent frame. Generally speaking, the base frame Fb and the dependent frame Fd usually corresponds the left-eye frame and right-eye frame, respectively.

In step S304, the image detection unit 110 detects the 3-D image data D, and compares the number image details between paired frames in order to determine and obtain the base frame Fb and the dependent frame Fd, wherein the paired frames constitute a visual 3-D image, and the base frame Fb has more image details than the dependent frame Fd. For example, the image detection unit 110 may perform a high pass filtering and thresholding process to enhance the image details of the paired frames, so that it may easily calculate and determine which frame has more image details than another one and which frame has less image details. In an embodiment, the step S304 comprises the detecting of a base block Bb of the base frame Fb and a dependent block Bd of the dependent frame Fd, wherein the base block Bb and the dependent block form a visual 3-D image block of the visual 3-D image data D.

In step S306, the image compensation unit 120 compensates for the dependent frame Fd to generate a compensated dependent frame based on the base frame Fb, and the image compensation unit 120 outputs the base frame Fb and the compensated dependent frame as a compensation 3-D image data Dc to the display device 130. Note that the compensation process may comprise sharpness compensation and color compensation. For example, in the sharpness compensation process, the compensation unit 120 filters the base block Bb by a detail enhancement filter, and adds the filtered base block Bb to the dependent block Bd, such that the sharpness of the frame is increased. Next, in order to compensate for the dependent frame Fd, the sharpness compensation for all of the blocks in the dependent frame Fd may be performed. In the color compensation process, the compensation unit 120 obtains an average base color value by calculating an average of the color values of pixels of the base block Bb, and obtains an average dependent color value by calculating an average of the color values of pixels of the dependent block Bd. Next, the compensation unit 120 obtains an average color value difference by subtracting the average dependent color value from the average base color value, and adds the average color value difference to each color value of the pixels of the dependent frame Fd.

In step S308, the display device outputs and displays the compensation 3-D image data Dc.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A 3-D image processing device for processing a 3-D image data, wherein the 3-D image data has a base frame and a dependent frame, comprising:
   a processor, configured to:
      detect the 3-D image data to obtain the base frame and the dependent frame;
      obtain a dependent block from the dependent frame;
      generate a plurality of pixel comparison results by comparing pixels data of the dependent block with a plurality of predetermined areas which are within the base frame and have the same vertical position as the dependent block;
      obtain a base block based on the pixel comparison results, wherein the base block and the dependent block constitute a visual 3-D image block;
      generate a compensation dependent frame by performing image compensation for the dependent frame based on the base frame; and
      perform sharpness compensation for the dependent block according to the base block; and
   a display device, displaying a 3-D compensation image data according to the base frame and the compensation dependent frame,
   wherein the base frame and the dependent frame constitute a visual 3-D image, and the base frame has more image details than the dependent frame, and the processor further obtains a first detail number and a second detail number by high pass filtering and thresholding to paired frames of the visual 3-D image, and one of the paired frames is determined as the base frame and another one of paired frames is determined as the dependent frame according the first detail number and the second detail number.

2. The 3-D image processing device of claim 1, wherein the processor further performs a color compensation for the dependent block according to the base block.

3. The 3-D image processing device of claim 1, wherein the processor further generates an average base color value according to a plurality of the color values of the pixels of the base frame, generates an average dependent color value according to a plurality of the color values of the pixels of the dependent frame, and performs a color compensation for the color values of pixels of the dependent block according to the difference between the average base color value and the average dependent color value.

4. The 3-D image processing device of claim 1, wherein a data format of the 3-D image data is a Blue-ray 3-D image data format or Multi-view Video Coding format.

5. A 3-D image processing method for processing a 3-D image data with a base frame and a dependent frame, comprising:
   detecting the 3-D image data to obtain the base frame and the dependent frame, wherein the base frame and the dependent frame constitute a visual 3-D image, and the base frame has more image details than the dependent frame;
   generating a compensation dependent frame by performing image compensation for the dependent frame based on the base frame;
   displaying a 3-D compensation image data according to the base frame and the compensation dependent frame;
   obtaining a dependent block from the dependent frame;
   generating a plurality of pixel comparison results by comparing pixels data of the dependent block with a plurality of predetermined areas which are within the base frame and have the same vertical position as the dependent block;
   obtaining a base block based on the pixel comparison results; performing sharpness compensation for the dependent block according to the base block;
   obtaining a first detail number and a second detail number by performing high pass filtering and thresholding to paired frames of the visual 3-D image; and
   determining one of the paired frames as the base frame and another one of the paired frames as the dependent frame according the first detail number and the second detail number,
   wherein the base block and the dependent block constitute a visual 3-D image block.

6. The 3-D image processing method of claim 5, further comprising: performing color compensation for the dependent block according to the base block.

7. The 3-D image processing method of claim 5, further comprising:
   generating an average base color value according to a plurality of the color values of the pixels of the base frame;
   generating an average dependent color value according to a plurality of the color values of the pixels of the dependent frame;
   performing color compensation for the color values of pixels of the dependent block according to the difference between the average base color value and the average dependent color value.

8. The 3-D image processing method of claim 5, wherein a data format of the 3-D image data is a Blue-ray 3-D image data format or Multi-view Video Coding format.

* * * * *